United States Patent [19]

Christy et al.

[11] Patent Number: 5,633,108
[45] Date of Patent: May 27, 1997

[54] MONOCOMPONENT RESISTIVE TONER FOR FIELD CHARGING

[75] Inventors: Orrin D. Christy, North Tonawanda; John E. Pickett, E. Amherst; Leo Swanson, Niagara Falls; Kevin J. Hook, Grand Island, all of N.Y.

[73] Assignee: Moore Business Forms, Inc., Grand Island, N.Y.

[21] Appl. No.: 536,050

[22] Filed: Sep. 29, 1995

[51] Int. Cl.$^6$ ..................................................... G03G 9/08
[52] U.S. Cl. ............................................. 430/110; 361/226
[58] Field of Search ..................................... 430/107, 110, 430/111, 137; 355/245; 361/226

[56] References Cited

U.S. PATENT DOCUMENTS

| | | | |
|---|---|---|---|
| 3,554,778 | 1/1971 | Granzow, Jr. | 117/17.5 |
| 4,060,647 | 11/1977 | Pan et al. | 427/21 |
| 4,084,018 | 4/1978 | Karr | 427/27 |
| 4,126,452 | 11/1978 | Nayar | 75/208 R |
| 4,284,701 | 8/1981 | Abbott et al. | 430/111 |
| 4,555,567 | 11/1985 | Hasegawa et al. | 430/110 |
| 4,681,829 | 7/1987 | Grushkin | 430/109 |
| 4,689,241 | 8/1987 | Richart et al. | 427/28 |
| 4,737,432 | 4/1988 | Tanaka et al. | 430/110 |
| 4,777,106 | 10/1988 | Fotland et al. | 430/120 |
| 4,803,142 | 2/1989 | Takagi et al. | 430/106.6 |
| 4,985,327 | 1/1991 | Sakashita et al. | 430/106.6 |
| 5,041,351 | 8/1991 | Kitamori et al. | 430/106.6 |
| 5,079,123 | 1/1992 | Nanya et al. | 430/106.6 |
| 5,155,532 | 10/1992 | Sakurada et al. | 355/245 |
| 5,176,979 | 1/1993 | Eguchi et al. | 430/110 |
| 5,178,984 | 1/1993 | Nagatsuka et al. | 430/110 |
| 5,236,799 | 8/1993 | Chen et al. | 430/109 |
| 5,260,746 | 11/1993 | Yoshida et al. | 355/245 |
| 5,266,434 | 11/1993 | Hirayama et al. | 430/111 |
| 5,272,040 | 12/1993 | Nakasawa et al. | 430/110 |

FOREIGN PATENT DOCUMENTS 494544  7/1992  European Pat. Off. .

*Primary Examiner*—John Goodrow
*Attorney, Agent, or Firm*—Finnegan Henderson Farabow Garrett & Dunner

[57] ABSTRACT

A toner composition for developing an electrostatic latent image comprising a base toner, which is a blend of a polymeric resin and a colorant, and one or more of a lubricating agent, a flowability agent, a charge-stabilizing agent, and a conductive agent, which has certain electrical characteristics. The base toner has a mean particle diameter ($D_{50}$) of 7 to 18 microns, and a bulk resistivity of greater than $10^{12}$ ohm-cm. The toner composition is prepared by blending a polymeric resin with a colorant and then blending a dry powder lubricating agent, and optionally other additives, with the base toner. The toner composition is charged by being disposed in an electrostatic fluidized bed from which the toner particles are levitated by air and then subjected to field charging created by a high voltage corona generating device contained within the bed.

22 Claims, 2 Drawing Sheets

MONOCOMPONENT RESISTIVE TONER FOR FIELD CHARGING

BACKGROUND OF THE INVENTION

1. Field of the Invention

The present invention relates to a toner composition for use in developing an electrostatic latent image, a method for its preparation, and a method for charging the toner composition. More particularly, the invention relates to toner components which, when used within a specific type of toner development system, provide a unique blend for application in a field charging method to exercise proper charging levels and stability.

2. Description of the Related Art

Toners including a polymeric resin and a coloring agent are known in the art of developing electrostatic images. Often, the toner is post-blended with colloidal silica or fine silica powder to improve the flowability of the toner. It is commonplace in the art to charge a toner before it is used to develop an electrostatic image. The method that has been traditionally used to charge the toner is triboelectrification. In the toning systems where the toner is charged triboelectrically, this is accomplished by rubbing of the toner particles against the carrier beads, against dissimilar surfaces inside the toner reservoir, or against a charging blade. This charge comes to a preset level determined by the time of agitation, the materials involved, and the level of agitation. When the toner attains that charge, there is no variability, i.e., the imaging system and toning system are optimized to a level of charge, one image potential on the imaging member of the system, and one speed. Any ratio of charge in the system (charge-to-area on the toner, charge-to-mass on the toner, and mass-to-area on the delivery rollers and latent image) is fixed. In other words, the development system and toner of the prior art are non-transportable to other imaging systems without significant modification and system optimization.

The present inventors have found that with the toner and charging method of the invention, the process is capable of a variable charge. With this capability, variable charge-to-area ratios on the toner are possible along with variable charge-to-mass ratios. From this, the mass-to-area coverage on the toner delivery rollers can be controlled. The result is control over the toner which allows imaging from 30 to 300 feet/minute with no change in image density or quality. This will be described in further detail below.

The toner and charging method of the present invention also have an advantage over the prior art in that once the toner formulation is established, the process can be expected to operate in a similar fashion regardless of the toner coloration. In contrast, a tribocharged toner of the prior art depends heavily on the chemical composition of the toner for the amount of charge it can develop, the pigmentation of the toner being integral to this composition. In short, with tribocharged toners, the charge level is very dependent on the coloration the toner. To have a color toner operate similar to another color within the same system requires considerable adjustment to other additives in the base toner. The present invention eliminates this problem by providing a charging process which is insensitive to toner formulation.

The prior art heretofore has not recognized the importance of the bulk (volume) resistivity of a toner composition to maintaining the charge distribution in a toner system, which is one aspect of the present invention discussed below. Further, the prior art does not teach charging a toner composition by suspending toner composition particles in air followed by subjecting the suspended toner particles to field charging.

Perhaps most importantly, there is no teaching or suggestion in the prior art of a toner which can be used in various imaging systems without modification and which can carry different pigmentation types without affecting its charge. Yet, such a toner and charging method would result in an even charge distribution, offering the advantage of a lowered electrostatic adhesion force, thus making image development more efficient by allowing for higher speed operation.

SUMMARY OF THE INVENTION

Accordingly, the present invention is drawn to a toner composition for developing an electrostatic latent image comprising a base toner which is a blend of a polymeric resin and a colorant and has a particle size distribution with a mean particle diameter ($D_{50}$) ranging from about 7 to about 18 microns and a bulk resistivity of greater than about $10^{12}$ ohm-cm.

Another embodiment of the present invention relates to a method for preparing a toner composition for use in developing an electrostatic latent image comprising blending a polymeric resin with a colorant to produce a base toner; grinding the base toner to produce particles having a mean particle diameter ($D_{50}$) ranging from about 7 to about 18 microns; and blending a dry powder lubricating agent with said base toner.

The present invention further relates to a method for charging a toner composition comprising disposing a toner composition including a base toner comprising a blend of a polymeric resin and a colorant, wherein the toner composition has a particle size distribution with a mean particle diameter ($D_{50}$) ranging from about 7 to about 18 microns and a bulk resistivity of greater than about $10^{12}$ ohm-cm, in an electrostatic fluidized bed containing a porous plate; passing air from below the porous plate to levitate the toner particles; above the porous plate; and field charging the levitated toner particles.

The inventors have found that by using the toner and method disclosed below, the image development system can be transported to alternative imaging systems with no major changes to the hardware. Further, because of the insensitivity of the charging method of the invention to the toner formulation, families of toner formulations with similar resin systems, size distributions, and surface additives charge to very similar levels regardless of the pigmentation found in the base toner.

Additional objects and advantages of the invention will be set forth in part in the description which follows, and in part will be apparent from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENT(S)

Figure 1:
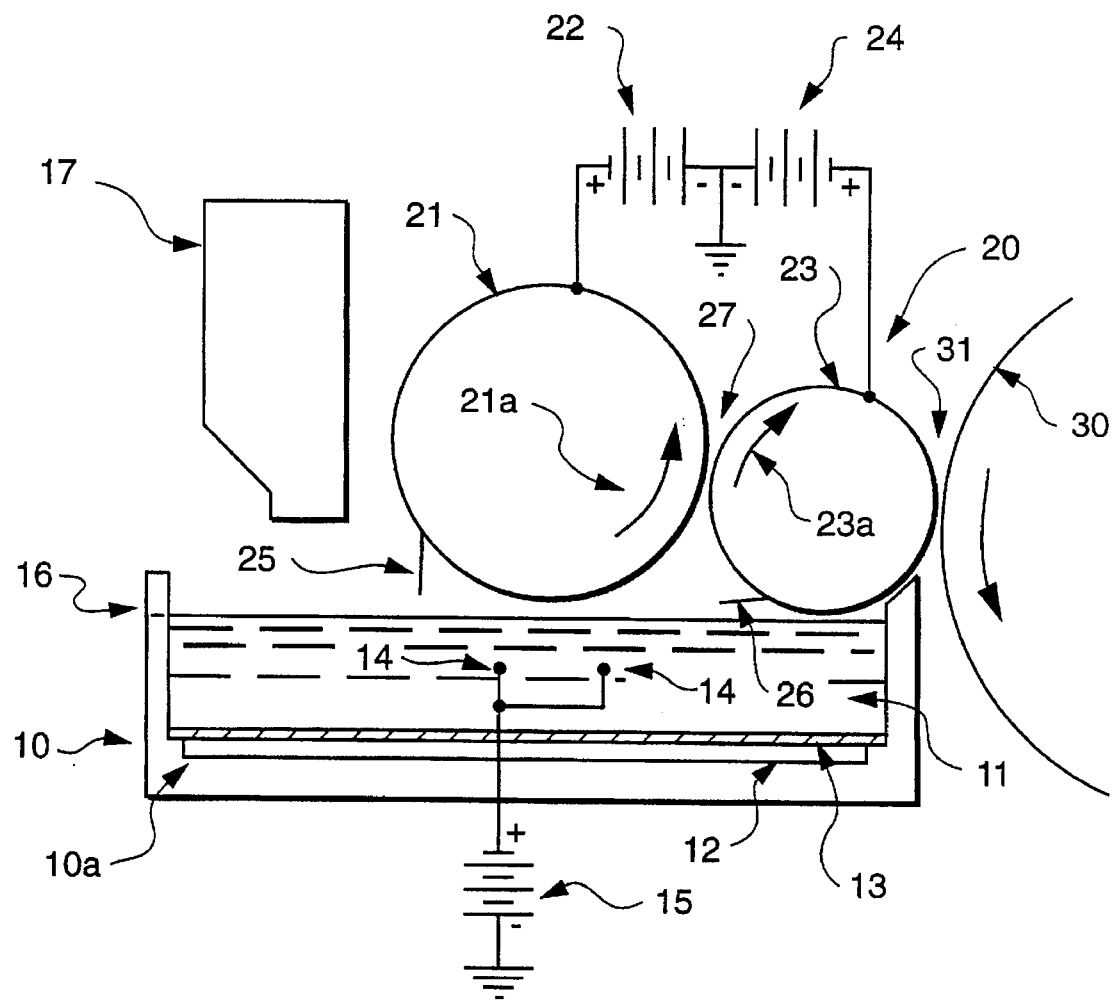
FIG. 1 shows an apparatus such as that described in U.S. application Ser. No. 07/639,3604, now U.S. Pat. No. 5,532, 100. This apparatus can be used to carry out the charging process of the present invention, and this is described in detail below.

Reference will now be made in detail to the presently preferred embodiments of the present invention.

In accordance with the invention, the toner composition comprises a base toner which is a blend of a polymeric resin and a colorant such as a pigment or dye. The base toner has a particle size distribution with a mean particle diameter ($D_{50}$) ranging from about 7 to about 18 microns, preferably from about 10 to about 12 microns. The toner composition has a bulk resistivity of greater than $10^{12}$ ohm-cm.

Polymeric resins that can be used in the present invention include, for example, but are not limited to, polyester resins, such as Atlac 382E by Reinhold, NCP-001 by Nippon Carbide, FC-122 by Mitsubishi Rayon, and HR5-11441 by Schenectady Chemical. Other polymeric groups of resins which may be utilized include polyamides, polyolefins, styrene acrylics, styrene methylacrylates, and styrene butadienes.

The colorant which can be blended with the polymeric resin may be a pigment or a dye. Suitable pigments include, but are not limited to, carbon black (Columbia Chemical, Raven 1000 or Cabot, Regal 330), cyan pigment (copper pthalocyanine blue, Hoechst Hasta-Perm Blue B2G or Ciba-Geigy Irgalite Blue LGLD), and magenta pigment (Hoechst, Hasta-Perm PINK-E, or Sandos, Sandorin Magenta BLT). Suitable dyes may include, but are not limited to, nigrosine, aniline, or phthalocyanine blue. When a pigment is used, the concentration is from about 0.25 to about 8% by weight, and more preferably from about 2.0 to about 5.0%. The fact that the presently claimed toner composition can carry such a wide variety of pigments and/or dye loads without serious reformulation and experimentation makes it extremely flexible for use in non-impact printing technologies.

The toner composition also comprises a dry powder lubricating agent, and, optionally, one or more of a flowability agent such as fine fumed silica and a charge-stabilizing agent such as fumed aluminum oxide. Lubricating agents that can be used in the present invention include, but are not limited to, tetrafluoroethylene (TFE) powder, polyethylene wax, carnauba wax, synthetic wax, polyvinylidene fluoride, or a metallic soap, such as zinc stearate. The concentration of the lubricating agent may range from about 0.05 to about 1.0% by weight. Preferably, the concentration of the lubricating agent ranges from about 0.1 to about 0.3% by weight.

Flowability agents which can be used in the present invention include, but are not limited to, fine fumed silica such as Cabot Cab-O-Sil TS-530 or its equivalent. The fine fumed silica can be added at a concentration ranging from about 0.25 to about 2.0% by weight. More preferably, the concentration of fine fumed silica ranges from about 0.5 to about 1.50% by weight. The mean particle size of the fine fumed silica may range from about 5 to about 30 nanometers.

The charge-stabilizing agent of the invention includes, but is not limited to, a fumed aluminum oxide compound such as EP C-604 from DeGussa AG. The fumed aluminum oxide can be added at a concentration ranging from about 0.5 to about 1.5% by weight. Preferably, the fumed aluminum oxide is added at a concentration ranging from about 0.75 to about 1.0% by weight. Alternative positive charge stabilizing agents may include fumed titanium dioxide compounds such as those made by Ishihara Corporation, and styrene-acrylic beads such as MP-2701 from Soken. Also, the charge-stabilizing agent may be chemically functionalized acrylic and styrene-acrylic ultra-fine powder. The charge stabilizing agent can be blended onto the surface of the toner to counteract any negative charge developed by the polymeric resin and the flowability agent, known as negatively charging materials on the triboelectric series, by tribocharging positively to give a near-zero charged toner particle.

A conductive agent may be added to slightly increase the surface conductivity to ensure more even charge distribution across the surface of individual toner composition particles. The conductive agent used includes, but is not limited to, a fumed carbon black compound such as Cabot XC-72, added in a concentration ranging from about 0.25 to about 1.0% by weight, preferably from about 0.25 to about 0.40%, or tin oxide, added in a concentration of from about 0.5 to about 1.5% by weight.

The present invention also relates to a method for preparing a toner composition comprising dry blending the polymeric resin with the colorant; melt kneading them on a two roll mill; pulverizing the base toner and then jet milling it produce particles having a mean particle diameter ($D_{50}$) ranging from about 7 to about 10 microns, preferably from about 10 to about 12 microns; and post-blending a dry powder lubricating agent to the ground base toner.

The lubricating agent aids in completely removing residual toner from the conductive rollers of the toning system used with the toner. The lubricating agent may preferably be post-blended with the base toner, e.g., by using a high speed mixer, such as a Henschell, simultaneously or in sequence with one or more of the flowability agent, the charge-stabilizing agent, or the conductive agent. These additives may be used to achieve increased triboelectric stability for the toner particle.

The level of electrostatic charge acquired by the toner during the field charging process is proportional to the second power of the diameter of the toner. A given amount of toner will have a distributed range of diameters, thus a distributed range of electrostatic charges, after field charging. To achieve the same process characteristics and resultant process responses, it is important that the manufacturing process yields the same size distribution to each type and amount of toner made. Then toners with dissimilar internal chemical make-up (e.g., pigments, dyes for coloration) will still acquire the same distributed level of electrostatic charges. This is important to assure uniform bed depletion when toners of two or more pigmented types are blended with each other to yield a secondary color.

A desired particle size distribution can be achieved by grinding particles to a predetermined particle size, e.g., about 11.5 microns mean particle diameter ($D_{50}$), then classifying the particles to reduce particles under a predetermined size, e.g., 5 microns, to under a predetermined percentage, e.g., 3.0%, of the distribution.

The invention is also directed to a process for charging the toner composition. The process comprises the steps of disposing a toner composition including a base toner including a blend of a polymeric resin and a colorant, wherein the base toner has a particle size distribution with a mean particle diameter ($D_{50}$) ranging from about 7 to about 18 microns and a bulk resistivity of greater than about $10^{12}$ ohm-cm, in an electrostatic fluidized bed containing a porous plate; passing air from below the porous plate to levitate the toner particles above the porous plate; and field charging the levitated toner particles.

The charging process of the present invention can be carried out using an apparatus such as that described in U.S. application Ser. No. 07/639,360 (See FIG. 1). In this apparatus, a walled container 10a holds an amount of the resistive monocomponent toner 11. The toner composition is maintained in a fluidized state by disposing it in an electrostatic fluidized bed. The toner composition is levitated by air, e.g., by a slowly rising uniform column of air or other ionizable gas, which is created by passing pressurized air from the plenum 12 through a fine porous plate 13. The flow rate of the air may preferably be 0.1 to 2.0 SCFH/in$^2$ of the porous plate, preferably 0.2 to 0.4 SFCH/in$^2$. Such a flow preferably sets up a vertically rising column of air within the fluidized bed at a velocity of about 0.09 to about 0.20 in/sec, thus suspending the toner composition particles above the porous plate. Here, the particles may be subjected to field charging created by a high voltage corona generating device (s) 14 contained within the fluidized bed of toner and run parallel to the roller assembly 20. The corona devices can receive an electrical potential of between +4.0 kV and +20.0 kV from a variable power supply 15.

As the toner comes under ionic bombardment in the influence of the associated electric field, the particles gather positive charge to a limit known as the Pauthenier limit. This process is known as field charging or Pauthenier charging, and though it is described with positive applied potentials and positive charge on the toner, it is a polarity reversible process with negative potentials also possible. The level of the toner 16 must be maintained as toner is depleted from the reservoir. A level sensing mechanism drives a toner dispensing system 17 which also carries a reservoir of toner for continuous system operation.

After the toner receives the induced charge from the corona devices 14 in the fluidized bed assembly 10, it is transported to the electrostatic latent image on the imaging member through the roller assembly 20 by electric field and electrostatic adhesion forces. The charged toner is first transported to primary roller 21 by the electric field between the corona devices and roller 21. Roller 21 rotates in a counterclockwise direction as shown by arrow 21a. Primary roller 21 is a conductive roller with a smooth, hard surface. It is held at an electrical potential by power source 22. In the present embodiment, this potential is +400 volts. Toner moves to the primary roller 21 and deposits onto the surface, forming a self-limiting layer thickness on the roller of about 1 monolayer or 15 microns thick. Toner can be held to the roller's surface by the electrostatic adhesion or image force. The toner layer can be transported counterclockwise to a point 27 where the layer is in direct opposition to a secondary roller 23 which rotates in a clockwise direction indicated by arrow 23a. Roller 23 can be held to an electrical potential of 0 volts.

Power source 24 is included in the figure even though in the current embodiment the roller is grounded. Other imaging systems such as laser printers or photocopiers may need the use of a different voltage bias to roller 23 along with different biases for the roller 21 and corona devices 14. When the toner layer is in position 27 between the opposing rollers, it comes under the influence of the electric field force between the rollers set up by the difference in potentials between the rollers. When the field force exceeds the electrostatic adhesion force on the primary roller 21, the toner jumps the gap to secondary roller 23. Secondary roller 23 is also conductive with a smooth, hard surface, and the toner layer is held to its surface by electrostatic adhesion forces. Residual toner remaining on roller 21 after this transfer step is removed by scraper blade 25 and returned to the fluidized bed. Negative toner is not transferred to the secondary roller 23 at this gap, thereby setting up a charge polarity filter. The toner layer on secondary roller 23 rotates clockwise on the roller until it comes into opposition with the latent electrostatic image (not shown) on the imaging member 30. In the preferred embodiment for this system, imaging member 30 is a dielectric cylinder with a negative polarity latent image of −400 volts, but the method and apparatus need not be limited to such a configuration. Other configurations may utilize imaging belts, positive latent images, or varying latent image potentials. At the closest point 31, positive toner jumps the gap to the latent electrostatic image by the electric field forces set up by the potential difference between roller 23 and the latent image, a process the same as the transfer in the gap from roller 21 to roller 23 as described above. Residual untransferred toner is returned to the fluidized bed after being scraped from the roller by blade 26. In order to help lubricate the interface between the doctoring blade 26 and the conductive rollers, the dry powder lubricating agent is included in the toner composition.

When the high voltage corona generating device used in the fluidized bed is a positive source, the toner composition takes on a mean positive charge by field charging (Pauthenier charging) which is calculated to be +13.3 µC/g. As time progresses, however, the toner composition starts to develop a triboelectric charge of its own: a negative charge. The charge develops from the high shear force imparted to the toner particles by the scraping blades, which remove residual toner from the roller. This negative triboelectric charging starts to negate the positive charging being done by the high voltage corona generating device. The reflection density of the printed image decreases, therefore, and the voltage required to maintain constant print density of the image increases. Effects of polarization or uneven charge distribution are manifested in the disruption of toner flow. Probable causes of this are possible chaining or agglomeration of toner particles due to the unevenness of charge distribution.

To achieve the desired stability of the toner composition, a charge-stabilizing agent and/or a conductive agent are post-blended with the base toner, simultaneously or in sequence with the addition of the flowability agent and the lubricating agent. Use of agents to control charge and polarization effects demonstrate much more uniform reflection densities.

Further, lateral motion of the toner composition, or lateral mobility, is important to the uniformity of the toner charge received by each individual particle. Such lateral mobility is typified by uniform cross flow at the surface of the toner bed and the absence of vents or volcanoes within the bed. In order to achieve this lateral mobility, the flowability agent, such as fine fumed silica, can be post-blended with the base toner, e.g., with a high-speed mixer such as a Henschell or Omni mixer. Lateral mobility of the toner composition should be greater than about 0.25 in/sec, preferably greater than about 0.5 in/sec.

The toner composition of the invention has a bulk resistivity of greater than about $10^{12}$ ohm-cm. Bulk resistivity is measured by passing an electrical current through a fused or solidified pellet of the toner. The potential difference across the pellet is applied through opposing electrodes and the current is measured. After accounting for the cross-sectional area and length of the pellet, a bulk resistivity is then calculated.

The primary reasons for a high bulk resistivity are the charge migration and the practicality of using high voltage coronas embedded in a fluidized bed of powder without shorting through to a grounded surface. After charging, the toner retains those ions which it receives from the corona within the fluidized bed. However, since part of the process involves surface contact with the system toner rollers and the latent electrostatic image on the image cylinder, a high surface resistivity is desirable to prevent the charging from bleeding off to the conductive surfaces it contacts. If enough of the charge bleeds off, the toner will no longer be able to be controlled by electric field forces and electrostatic adhesion forces. The other interaction which also is dependent on surface charge migration involves the ultimate tribocharging of the toner within the system and how the charge distributes itself on the surface. The field charging from the coronas (positive) in the fluidized bed charges the toner evenly, whereas the tribocharging of the toner (negative) occurs on the high points of the toner as discussed above. The tribocharging is caused by toner being rubbed against the system rollers while being scraped off by the scraper blades.

The present inventors have found that these charge distributions control the cohesion of the toner particles to one another. A sensitive balance exists wherein too much cohesion results in loss of the lateral flow properties of the toner, but too little cohesion causes loss of image integrity when the toner is transferred to the paper at high speeds. The inventors have found a balance with the amount of charge (both positive and negative) on the toner and the distribution of charge on the surface. The present inventors have found that bulk resistivity of the material is an important factor to insure the charge distribution is maintained.

One further aspect of the invention is the insensitivity of the charging method to toner formulation. The field charging process allows for the consistent and uniform charging of color toners. As a result, the toners require no special charge directive constituents to control the final charge of the toner particle. The sign and magnitude of the electrical charge on the color toner particle is simply a function of the field magnitude and sign used to generate an electrical coronal discharge to which the toner is exposed.

The present invention is illustrated by way of the following examples. It is to be understood that the invention is not to be limited to the specific conditions or details set forth in these examples except insofar as such limitations are specified in the appended claims.

EXAMPLE 1

To produce a black shade toner, approximately 4% by weight of carbon black pigment (Cabot Regal 330) was blended and melt kneaded into a polyester resin (Atlac 382E by Reinhold). This mixture was pulverized and jet-milled to an average particle diameter ($D_{50}$) of 11.5 microns, then classified to reduce particles under 5 microns to under 3% of the distribution and reduce particles over 20 microns to under 3% of the distribution. The polymer resin/colorant mixture, in a powder form, was post blended into a high speed mixer with a simultaneous blend of 0.75% by weight of a treated fumed silica flowability agent (Cabot TS-530), 0.75% by weight of a fumed aluminum oxide charge stabilizing agent (DeGussa C-604), and 0.15% by weight of zinc stearate (Syn-Pro type ACF, Dart Industries).

EXAMPLE 2

To produce a reflux blue shade toner, approximately 4% by weight of reflux blue pigment (Reflex Blue, AGH-G by Hoechst) was blended and melt kneaded into a polyester resin (Atlac 382E by Reinhold). This mixture was pulverized and jet-milled to an average particle diameter ($D_{50}$) of 11.5 microns, then classified to reduce particles under 5 microns to under 3% of the distribution and reduce particles over 20 microns to under 3% of the distribution. The polymer resin/colorant mixture, in a powder form, was post blended in a high speed mixer with a simultaneous blend of 0.75% by weight of a treated fumed silica flowability agent (Cabot TS-530), 0.75% by weight of a fumed aluminum oxide charge stabilizing agent (DeGussa C-604), and 0.15% by weight of zinc stearate (Syn-Pro type ACF, Dart Industries).

EXAMPLE 3

To produce a black shade tones, approximately 4% by weight of carbon black pigment (Cabot Regal 330) was blended and melt: kneaded into a polyester resin (Atlac 382E by Reinhold). This mixture was pulverized and jet-milled to an average particle diameter ($D_{50}$) of 11.5 microns, then classified to reduce particles under 5 microns to under 3% of the distribution and reduce particles over 20 microns to under 3% of the distribution. The polymer resin/colorant mixture, in powder form, was post blended in a high speed mixer with a simultaneous blend of 0.75% by weight of a treated fumed silica flowability agent (Cabot TS-530), 0.5% by weight of an ultra-fine powder styrene-acrylic, charge stabilizing agent (Soken MP-2701), and 0.15% by weight of zinc stearate (Syn-Pro type ACF, Dart Industries).

EXAMPLE 4

To produce a magenta shade toner, approximately 4% by weight of magenta pigment (Hoechst HastaPerm PINK-E) was blended and melt kneaded into a polyester resin (Atlac 382E by Reinhold). This mixture was pulverized and jet-milled to an average particle diameter ($D_{50}$ of 11.5 microns, then classified to reduce particles under 5 microns to under 3% of the distribution and reduce particles over 20 microns to under 3% of the distribution. The polymer resin/colorant mixture, in powder form, was post blended in a high speed mixer with a simultaneous blend of 0.75% by weight of a treated fumed silica flowability agent (Cabot TS-530), 0.5% by weight of an ultra-fine powder styrene-acrylic charge stabilizing agent (Soken MP-2701), and 0.15% by weight of zinc stearate (Syn-Pro type ACF, Dart Industries).

The results of charging toner using the tribocharging process versus the field charging process can be demonstrated in two ways using physical measurements. These will be shown in the following two examples.

EXAMPLE 5

Triboelectrically charged toners acquire their electrostatic charge by rubbing against dissimilar surfaces. Toner particles are irregular in shape due to the nature of the manufacturing process. If such an irregular particle is rubbed against another surface, only the high points of the particles are in contact and, therefore, it is these points which acquire the charge. The charge is concentrated on the high points of the toner.

Field charged toner acquires its charge while undergoing ion bombardment in an electric field. A corona generating device within the fluidized bed not only creates the ions, but also sets up the electric field. Since particles are being levitated by the fluidized air, they are free to move and rotate. Under such conditions, the charge acquired is evenly distributed on its surface.

To demonstrate the difference, the two toners are placed on a conductive metallic surface. They will be held to this surface by the electrostatic adhesion force (image force). One method to measure the adhesion force is to apply an electric field on the toner and measure the amount of toner removed by a given field strength. Then by calculating the electric field force required the toner from the conductive surface, we can determine the comparative adhesion forces on the two toners.

Figure 2:
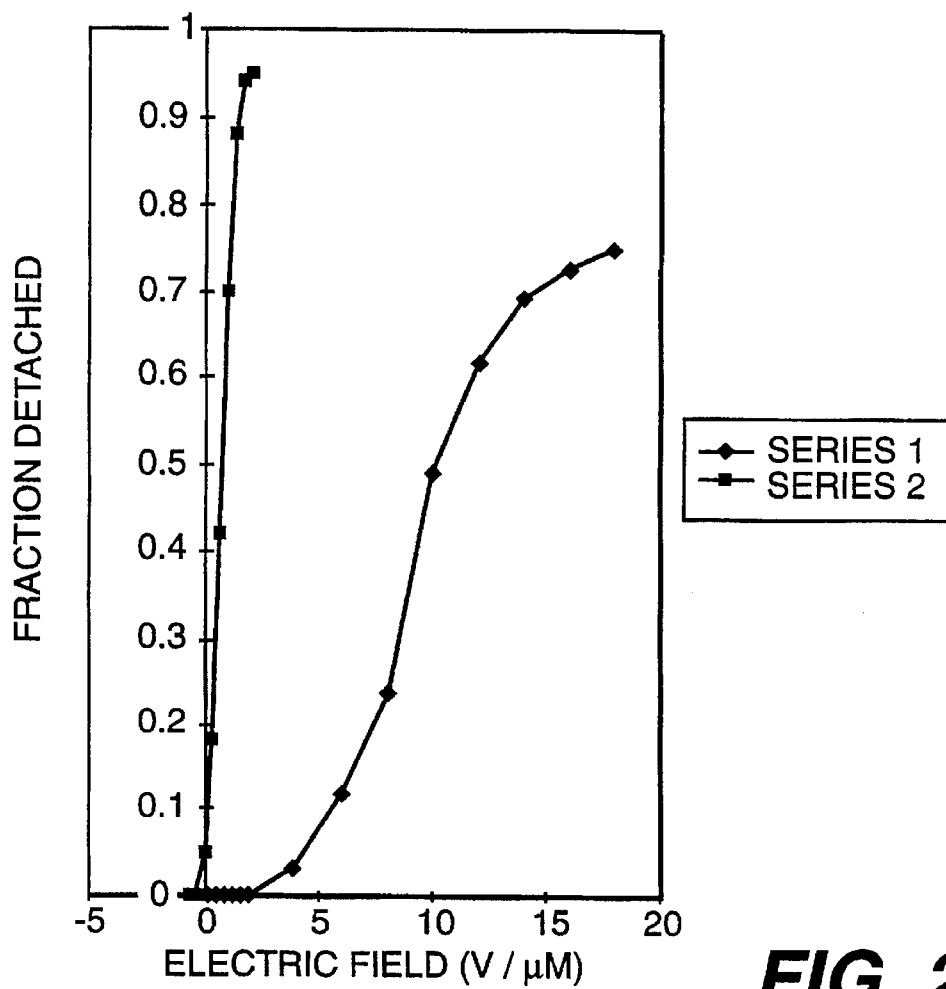
FIG. 2 is a comparison between tribocharged and field-charged toners, showing the electric field necessary to detach each toner.

Referring to FIG. 2, a comparison is made between tribocharged and field charged toners. Both toners had similar size distributions and similar electrostatic charge levels. On FIG. 2, the series one plot is for the tribocharged toner [data source: E. A. Eklund et al., Toner Adhesion Physics: Measurements of Toner/Substrate Contact Area, IS&T Proceedings, 10th Int. Cong. on Non-Impact Printing: 79–81 (IS&T, Springfield, Va. 1994). The series two plot is that of field charged toner [data source: O.D. Christy, Surface Adhesion Properties of Field Charged Toners in a High Speed Toner Applicator, to be published in IS&T Proceedings, 11th Int. Cong. on Non-Impact Printing, 1995].

Comparing the two plots, the electric field necessary to detach the tribocharged toner is over 8 times greater than the field charged toner. Even though each toner has a similar electrostatic charge, it is the uneven distribution of this charge on the tribocharged particles which magnifies the adhesion forces. Note also that the total transferred toner is higher with the field charged toner (95%) than that of the tribocharged toner (75%).

The resultant advantage of the field charged toner are manifested in lowered surface adhesion forces which results in higher possible operational speeds and a greater transfer efficiency for a charged layer of toner.

EXAMPLE 6

As explained above, triboelectrically charged toners acquire their electrostatic charge by rubbing against dissimilar surfaces. This is accomplished in most development systems by mixing and tumbling the toner using paddles, beating blades, or magnetic transport rollers. The toner acquires charge on its high points as it moves and tumbles through the mixing reservoir. The process is random in nature and time is needed to fully bring the toner to an equilibrium level of charge. The rate at which the toner charges and its ultimate equilibrium level are influenced by factors such as material, humidity, toner, concentration, and agitation rate. Typically, in tribocharging systems, rates of charging are generally expressed in seconds or tens of seconds.

Figure 3:
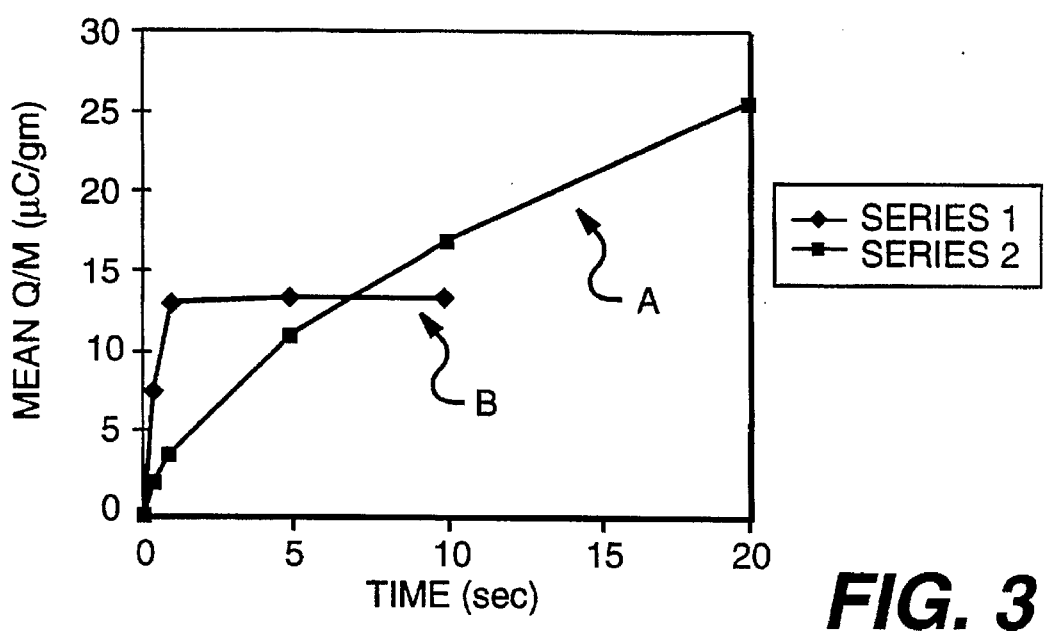
FIG. 3 shows a typical charging curve for a triboelectric charging toner system versus a charging curve for a field charging toner.

In FIG. 3, plot A represents such an actual charging curve for a triboelectric charging toner system with very vigorous agitation on a magnetic roller. [Data source: J. H. Anderson, Charging Rates of Dry Electrophotographic Toners; IS&T Proceedings, 5th Int. Cong. on Non-Impact Printing: 89–94, IS&T, Springfield, Va., 1989] The equilibrium level for this toner is a charge-to-mass ratio of 85 µC/gm, which is reached after 250 seconds.

Plot B in FIG. 3 represents an actual charging curve for field charging toner. The charge equilibrium level for this toner under the test conditions is 13.3 µC/gm. This was achieved with the system rollers moving with a surface velocity of 100 feet/minute and the driving corona voltage set at 7.05 kV. This level is set by the driving voltage on the corona devices in the fluidized bed. Where the triboelectric charged toner (plot A) is slower to achieve its equilibrium charge level and this level is fixed by the charging factors, field charged toner (plot B) responds to the potential on the driving corona and equilibrates in under 2 seconds. Changing the corona potential changes the charge level on the toner. The ability to change the charge level on the toner and to do the process rapidly are imperative when working with non-impact printing systems which have a variable speed capability.

What is claimed is:

1. A toner composition for developing an electrostatic latent image comprising a base toner including a blend of a polymeric resin and a colorant, wherein the base toner composition has a particle size distribution with a mean particle diameter ($D_{50}$) ranging from about 7 to about 18 microns and a bulk resistivity of greater than about $10^{12}$ ohm-cm.

2. The toner composition of claim 1, wherein the mean particle diameter ($D_{50}$) ranges from about 10 to about 12 microns.

3. The toner composition of claim 1, wherein the colorant is a pigment and is present at a concentration ranging from about 0.25 to about 8% by weight.

4. The toner composition of claim 1, further comprising one or more of a lubricating agent, a flowability agent, a charge-stabilizing agent, and a conductive agent.

5. The toner composition of claim 4, wherein the lubricating agent is a dry powder lubricating agent which is present at a concentration ranging from about 0.05 to about 1.0% by weight.

6. The toner composition of claim 4, wherein the flowability agent is fine fumed silica present at a concentration ranging from about 0.25 to about 2.0% by weight.

7. The toner composition of claim 4, wherein the charge-stabilizing agent is fumed aluminum oxide, fumed titanium dioxide, or chemically functionalized acrylic and styrene-acrylic ultra-fine powder, and is present at a concentration ranging from about 0.5 to about 1.5% by weight.

8. The toner composition of claim 4, wherein the conductive agent is tin oxide present at a concentration ranging from about 0.5 to about 1.5% by weight.

9. The toner composition of claim 4 wherein the conductive agent is fumed carbon black present at a concentration ranging from about 0.25 to about 1.0% by weight.

10. A method for preparing a toner composition for use in developing an electrostatic latent image comprising:

dry blending a polymeric resin with a colorant;

melt kneading the resin and colorant blend;

grinding and jet-milling the base toner to produce particles having a mean particle diameter ($D_{50}$) ranging from about 7 to about 18 microns; and blending a dry powder lubricating agent with the ground base toner.

11. The method of claim 10, further comprising:

blending with the ground base toner, simultaneously or in sequence with the dry powder lubricating agent, one or more of a flowability agent, a charge-stabilizing agent, and a conductive agent.

12. The method of claim 10 wherein the lubricating agent is a dry powder lubricating agent present at a concentration ranging from about 0.05 to about 1.0% by weight.

13. The method of claim 11 wherein the flowability agent is fine fumed silica present at a concentration ranging from about 0.25 to about 2.0% by weight.

14. The method of claim 11 wherein the charge-stabilizing agent is fumed aluminum oxide, fumed titanium dioxide, or chemically functionalized acrylic and styrene-acrylic ultra-fine powder, and is present at a concentration ranging from about 0.5 to about 1.5% by weight.

15. The method of claim 11 wherein the conductive agent is tin oxide present at a concentration ranging from about 0.5 to about 1.5% by weight.

16. The method of claim 11 wherein the conductive agent is fumed carbon black present at a concentration ranging from about 0.25 to about 1.0% by weight.

17. A method for charging a toner composition comprising the steps of:

disposing a toner composition comprising a base toner including a blend of a polymeric resin and a colorant, wherein the toner composition has a particle size distribution with a mean particle diameter ($D_{50}$) ranging from about 7 to about 18 microns and a bulk resistivity of greater than about $10^{12}$ ohm-cm, in an electrostatic fluidized bed containing a porous plate;

passing air from below said porous plate to levitate the toner particles above the porous plate; and field charging the levitated toner particles.

18. The method of claim 17, wherein the flow rate of the air ranges from about 0.1 to about 2.0 $SCFH/in^2$.

19. The method of claim 17, wherein the flow rate of the air is 0.2 to 0.4 $SCFH/in^2$.

20. The method of claim 17, wherein the toner particles are levitated by a slowly rising uniform column of air.

21. The method of claim 17, wherein the field charging is created by a high voltage corona generating device.

22. The method of claim 17, wherein the voltage ranges from about +4.0 to about +20.0 kilovolts.

* * * * *